(12) United States Patent
Belmond et al.

(10) Patent No.: US 7,504,601 B2
(45) Date of Patent: Mar. 17, 2009

(54) SENSOR MODULE FOR RELEASING VEHICLE WINDOWS AND THE LIKE

(75) Inventors: Jean-Marc Belmond, St. Jean le Blanc (FR); Emmanuel Huber, Chateauneuf sur Loire (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 1014 days.

(21) Appl. No.: 10/891,461

(22) Filed: Jul. 14, 2004

(65) Prior Publication Data

US 2005/0034373 A1 Feb. 17, 2005

(30) Foreign Application Priority Data

Jul. 15, 2003 (FR) .................................. 03 08605

(51) Int. Cl.
*H01H 3/16* (2006.01)
(52) U.S. Cl. ................................................. 200/61.62
(58) Field of Classification Search ... 200/61.41–61.44, 200/61.58 R, 61.61, 61.62, 61.85, 1 B; 292/347, 292/336.3; 340/5.72, 5.62, 568.5, 522, 426, 340/539, 573.1; 70/237, 255, 258; 307/9.1, 307/10.1
See application file for complete search history.

(56) References Cited

U.S. PATENT DOCUMENTS

| 5,134,392 | A | 7/1992 | Takeuchi et al. | |
|---|---|---|---|---|
| 6,575,003 | B1 | 6/2003 | Dupont | |
| 6,740,834 | B2* | 5/2004 | Sueyoshi et al. | 200/600 |
| 6,822,174 | B1* | 11/2004 | Spies | 200/52 R |
| 7,057,124 | B2* | 6/2006 | Ieda et al. | 200/61.62 |
| 7,091,823 | B2* | 8/2006 | Ieda et al. | 340/5.72 |
| 7,140,653 | B2* | 11/2006 | Kobayashi et al. | 292/348 |
| 7,199,317 | B2* | 4/2007 | Ieda et al. | 200/61.62 |
| 7,217,899 | B2* | 5/2007 | Hidaka et al. | 200/600 |
| 7,273,991 | B2* | 9/2007 | Korultay et al. | 200/61.62 |
| 7,284,776 | B2* | 10/2007 | Cummins et al. | 292/336.3 |
| 7,331,618 | B2* | 2/2008 | Jooss et al. | 292/336.3 |
| 7,375,299 | B1* | 5/2008 | Pudney | 200/61.62 |

FOREIGN PATENT DOCUMENTS

EP 0 134 985 3/1985

(Continued)

OTHER PUBLICATIONS

French Search Report dated Apr. 16, 2004.

*Primary Examiner*—Michael A Friedhofer
(74) *Attorney, Agent, or Firm*—Carlson, Gaskey & Olds

(57) ABSTRACT

A release control sensor module for an openable member of a vehicle, such as a vehicle window, includes a first sensor and a second sensor. The first sensor is a displacement sensor that controls the closure of an electric circuit, such as a changeover switch or a reed switch. The second sensor is powered by the electric circuit. The first sensor controls the activation of the electronic circuit. If the first sensor is not actuated, the sensor module is electrically isolated and does not consume any power. If the first sensor is actuated, the second sensor is powered and can be used to detect movement of a moving part of the control, such as a pull handle or an opening lever.

21 Claims, 4 Drawing Sheets

FOREIGN PATENT DOCUMENTS

| | | |
|---|---|---|
| EP | 0 0694 664 | 1/1996 |
| FR | 2 835 866 | 8/2003 |
| FR | 2 835 867 | 9/2003 |
| GB | 2 150 402 | 7/1985 |
| JP | 8 270279 | 10/1996 |

* cited by examiner

SENSOR MODULE FOR RELEASING VEHICLE WINDOWS AND THE LIKE

REFERENCE TO RELATED APPLICATIONS

This application claims priority to French Patent Application FR 03 08 605 filed on Jul. 15, 2003.

TECHNICAL FIELD

The invention relates to motor vehicles, and more specifically to a control that releases an openable member, such as a vehicle window.

BACKGROUND OF THE INVENTION

A motor vehicle lock retains an openable member in a closed position and also allows the openable member to be opened when an internal or external opening control linked to the lock is activated by a user. This type of lock is typically fitted to the vehicle openable member. The lock includes a catch that retains a fingered member mounted on the vehicle relative to the lock or conversely frees the fingered member. Freeing the fingered member from the catch frees the openable member and is known as opening or "releasing" the lock. Conversely, the act of retaining the fingered member by the catch prevents the openable member from opening and is known as closing the lock. The catch is biased toward the closed position by the fingered member when the openable member is closed. A keeper prevents the catch from returning to the open position and the lock from being held in a closed position in the absence of external action on the lock. Preventing the opening of the lock when the external opening control is acted upon is known as "security locking" the lock. "Security unlocking" is the reverse operation, which opens the lock when the external opening control is acted upon.

There are several possible ways for opening a lock. On conventional mechanical locks, the lock is opened by acting on the external opening control or the internal opening control. The security locking and unlocking operations are conventionally carried out by using a sill-mounted pull knob, an electromechanical actuator, or other actuator. A catch bolt is also used for security locking or unlocking a vehicle trunk or front door. In this case, for a mechanical lock, a link must be provided between the lock and the catch bolt.

U.S. Pat. No. 5,134,392 discloses a keyless opening system. The opening system uses a transmitter powered by a long-life battery. European Patent No. A 0 694 664 discloses an electric motor vehicle lock. The lock is opened electrically by operating an actuator powered by the vehicle battery. A standby power source including a standby battery is installed in the door to which the lock is attached. In the event of a power failure of the vehicle battery, the lock can be opened using the power supplied by the standby battery.

French patent applications serial numbers FR 02-01698 and FR 02-01699 disclose electric and mechanical locks. In the normal operating condition of the lock, when unlocked, action on the mechanical opening control of the lock activates the electric opening of the lock and starts the opening motor. These patent applications disclose a power supply and a sensor or software redundancy to provide security in the opening of the lock.

Furthermore, different locking systems, such as electrical and mechanical systems, are commonly provided on the same range of motor vehicles. One of the drawbacks of these locking systems is that there is a reduction in variety.

There is therefore a need for a simple, reliable and rugged solution that detects the actuation of the control for motor vehicle openable member opening controls.

SUMMARY OF THE INVENTION

The present invention provides a sensor module including a first displacement sensor that detects displacement of a moving part even when not supplied with power, an electric circuit, and a second sensor to confirm detection by the first sensor. The closure of the electric circuit is controlled by the first sensor.

In one embodiment, the second sensor is powered or read by the electric circuit. In this embodiment, the second sensor is preferably either a deformation sensor, a displacement sensor, a force sensor or a proximity sensor.

The first sensor may be a changeover switch or a reed switch. The second sensor may also be a changeover switch or a reed switch. Preferably, the first and second sensors use different detection technologies.

Another embodiment of the present invention provides a motor vehicle openable member release control including the sensor module and a moving part. The movement of the moving part is detected by the first and second sensors.

Other characteristics and advantages of the invention are given in the following description, given by way of example and with reference to the drawings.

DETAILED DESCRIPTION OF PREFERRED EMBODIMENTS

In a first embodiment, described with reference to FIGS. 1 to 3, the present invention provides a sensor module for a motor vehicle opening control. The sensor module includes a first sensor that controls the closure of an electric circuit. The sensor module includes a second sensor which is powered by the electric circuit and/or read by the electric circuit. When the first sensor is not actuated, the first sensor electrically isolates the sensor module. In particular, the second sensor does not consume any power. The power consumption of the sensor module is therefore zero. If the first sensor is actuated, the electric circuit is closed and the second sensor is active.

The sensor module can then provide redundant detection to confirm the application of a command to a lock fitted with the sensor module.

Figure 1:
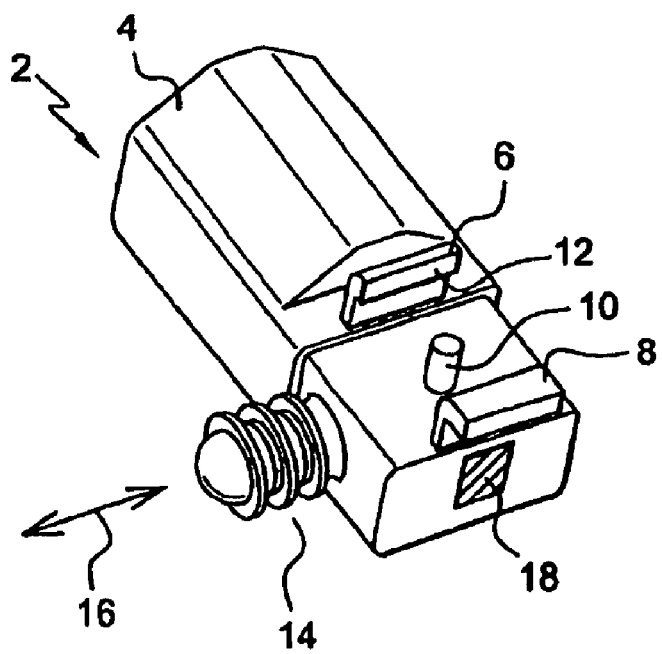
FIG. 1 illustrates a schematic perspective view of a sensor module according to a first embodiment of the invention.

FIG. 1 shows a schematic perspective representation of a sensor module 2 according to one embodiment of the present invention. The sensor module 2 includes a housing 4 including assembly features to attach the sensor module 2 on a component of an opening control. In the example in FIG. 1, the assembly features include two tabs 6 and 8 and a stud 10. The stud 10 is closer to one tab 8 than the other tab 6 and acts as a locating feature, as explained below with reference to FIG. 6. One tab 8 is curved, and the other tab 6 includes a stop 12 allowing for assembly of the sensor module 2 on the opening control by inserting the curved tab 8 into a first slot and elastically deforming the tab 6 to push it into a second slot. When the sensor module 2 is assembled, the stop 12 retains the sensor module 2 in position. However, it is to be understood that assembly features other than the tabs 6 and 8 described in the example could be used. The locating feature may also be dispensed with, particularly if the assembly configuration prevents confusion over the positioning of the sensor module 2.

The sensor module 2 includes a first sensor, which is a displacement sensor. In FIG. 1, the displacement sensor is a changeover switch which changes state when a moving part is displaced. The moving part is mounted on flexible bellows 14 and is moveable in the direction of the arrow 16. Regardless of its change of state, the first sensor controls the closure of an electric circuit. In the example, the electric circuit is open when the first sensor is not actuated, and the electric circuit closes when the first sensor is mechanically actuated in the direction of the lowering of the moving part in the housing 4. The first sensor is then mechanically actuated by a part of the opening control or by a specific cam.

As described in the examples in the rest of the description, a mechanically actuated changeover switch is only one example of the first sensor that controls the closure of the electric circuit. In particular, a reed switch could be used instead of a changeover switch. A reed switch sensor includes a glass bulb containing two strips close to each other that are brought into contact under the effect of a magnetic field. The electric circuit closes when the strips contact each other. In this case, the first sensor detects the displacement of a magnet fitted to the moving part in the opening control. In both examples, the first sensor is able to detect displacement even when it is not supplied with power.

The sensor module 2 also includes a second sensor. The second sensor can be a displacement sensor, a force sensor, a deformation sensor or a proximity sensor. In the example in FIG. 1, the second sensor is a Hall effect sensor. The sensing part 18 of the second sensor is shown schematically on the side of the housing 4. The electric circuit supplies power to the second sensor, and the first sensor controls the closure of the electric circuit. When the second sensor is powered, it can detect at least one of displacement, force, deformation or the proximity of another part.

The second sensor may be, but is not limited to, a changeover switch, a Hall effect sensor (in the examples in FIGS. 2 and 3), a reed switch (in the example in FIG. 4) an optical displacement sensor, a capacitive approach detection sensor, an ultrasonic approach detection sensor, an inductive variable reluctance or eddy current proximity sensor, a resistive, optical, magnetic or other encoder, a deformation sensor (such as a strain gauge or a piezoelectric diaphragm) or a force sensor (such as a piezoelectric, magnetostrictive or strain gauge sensor). Preferably, the first and second sensors use different technologies to reduce the risk of a common failure mode.

The sensor module 2 in FIG. 1 operates as follows. When first sensor is not actuated, the sensor module 2 is idle. In this state, the electric circuit is open and the second sensor is not supplied with power. When the first sensor is actuated by mechanical action on the moving part, the flexible bellows 14 contract, and the first sensor closes the electric circuit to power the second sensor. The second sensor can then detect, depending on its operating method, displacement, force, deformation or the proximity of another part.

As explained with reference to FIGS. 6 to 9, the sensor module 2 can be used in a motor vehicle openable member release control. If release is authorized, the first sensor delivers a signal to trigger the release after the electronics "wake up" from a standby mode if necessary. A second signal from the second sensor is used to enable or validate the command to start the lock release motor.

The sensor module 2 has several advantages. For one, the presence of the first sensor and the second sensor in the sensor module 2 allows for redundancy and ensures reliable detection of a release command. The redundancy reduces the risks of the electric release lock system from releasing spontaneously. If the first sensor is faulty and indicates actuation (in the example in FIG. 1, if the moving part remains lowered), the second sensor provides a reliable indication of actuation. Conversely, if the second sensor is faulty and indicates actuation, this is disregarded unless the first sensor is actuated. This prevents occurrence of a spontaneous release that may cause a dangerous situation, such as spontaneous release when the vehicle is moving or when the vehicle is stationary on a slope, etc.

Moreover, when the vehicle is stationary (for example, if the vehicle is parked long-term), the first sensor opens the electric circuit. The sensor module 2 and its control electronics do not consume any power, preventing rapid discharge of the battery. When the first sensor is actuated, the system control electronics are started by closing the electric circuit.

The sensor module 2 also can easily be retrofitted to an opening control, depending on the type of opening control. If a reed switch is used as a first sensor, a magnet can be fitted to the opening control at the same time. This also applies if the second sensor is a Hall effect sensor. In any case, as shown in FIGS. 6 to 9, the same parts are used to produce different release controls. The sensor module 2 therefore contributes to the reduction in required inventory.

FIG. 1 is only an example. In particular, the first sensor is preferably controlled so that it electrically opens the circuit when the first sensor is not actuated. In other words, the first sensor closes the electric circuit when the first sensor is actuated. If the first sensor includes a spring, this ensures that the spring is relaxed when the first sensor is not actuated or when the opening control is in the idle state. The first sensor can also permanently close the electric circuit when the opening control is idle. In this case, the first sensor is actuated when the opening control is in an idle state to open the electric circuit. The first sensor controls the closure of the electric circuit when it is not actuated by the opening control. In both cases, the first sensor ensures that the electric circuit is closed when a user actuates the opening control.

Figure 2:
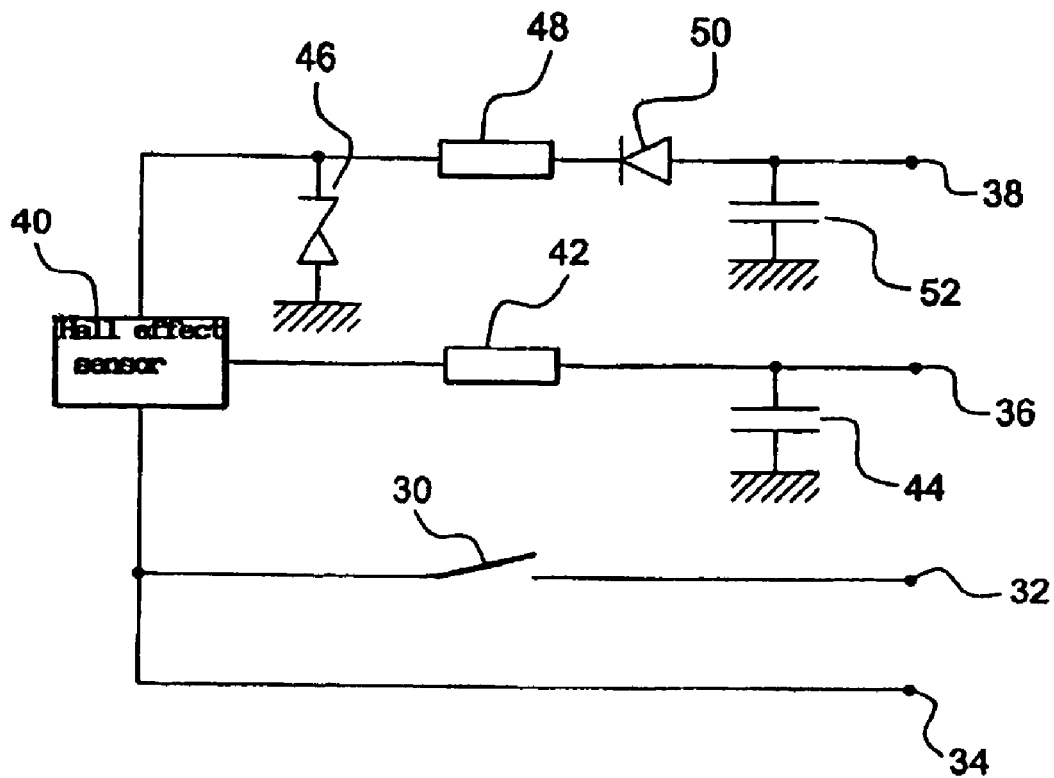
FIG. 2 illustrates an electrical schematic of the sensor module in a first embodiment of the invention.
Figure 3:
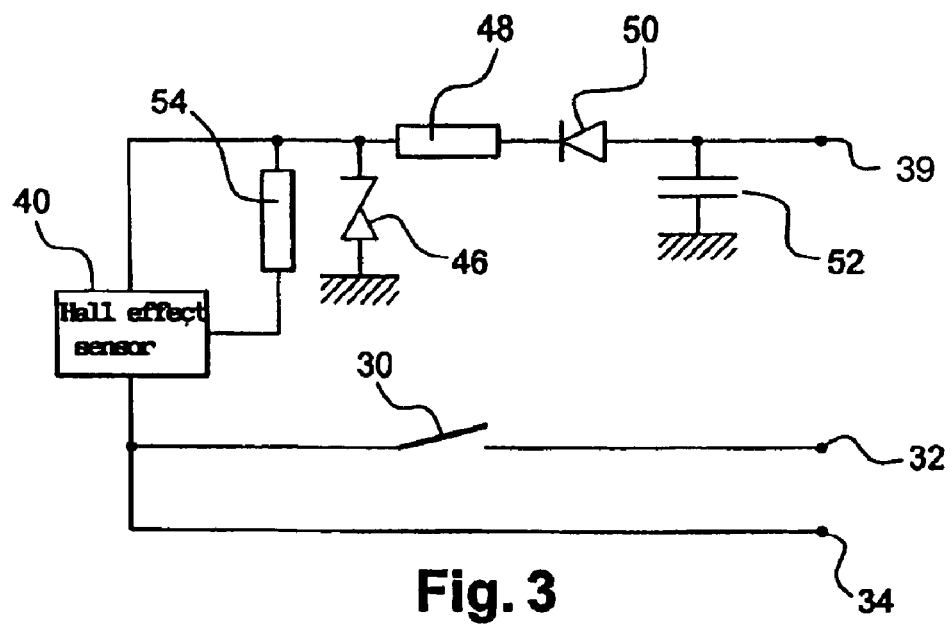
FIG. 3 illustrates another electrical schematic of the sensor module in the first embodiment of the invention.

FIGS. 2 and 3 show sensor module electric circuits in which the second sensor is a Hall effect sensor. The circuits do not show the way in which the first sensor controls the closure of the electric circuit, but simply show the reading electronics for the first and second sensors.

The example in FIG. 2 shows the first sensor 30 as a changeover switch. The circuit includes four terminals 32, 34, 36 and 38. A supply voltage is applied to the supply terminal 38, and the ground terminal 34 is connected to ground. The second terminal 36 provides a signal representative of the state of the second sensor 40, and the first terminal 32 provides a signal representative of the state of the first sensor 30. The first sensor 30 is mounted in series between the first terminal 32 and the ground terminal 34. The second sensor 40 is connected to the ground terminal 34. Its supply terminal is connected to the supply terminal 38 through a resistor 48 and a diode 50. A terminal of a Zener diode 46, also connected to ground, is connected between the second sensor 40 and the resistor 48. A protective capacitor 52 is connected between ground and the supply terminal 38. The resistor 48 and the Zener diode 46 provide surge protection. The diode 50 protects the second sensor 40 against the reversal of the battery terminals, and the protective capacitor 52 protects the second sensor 40 against electric and electrostatic discharge. A state terminal of the second sensor 40 is connected to the second terminal 36 through a resistor 42. A protective capacitor 44 is connected between the ground and second terminal 36. The resistor 42 provides surge protection, and the protective capacitor 44 protects the second sensor 40 against electric and electrostatic discharge. The second terminal 36 of the circuit in FIG. 2 provides a signal representative of the state of the second sensor 40, and first terminal 32 provides a signal representative of the state of the first sensor 30.

The example in FIG. 3 is similar to the example in FIG. 2, but the second sensor 40 is mounted with a terminal 39 that acts both as a supply terminal and a reading terminal that reads the state of the second sensor 40. The example of FIG. 3 does not include the resistor 42 and the protective capacitor 44. The second sensor 40 is connected by a resistor 54 to the terminal 39. The measurement of the voltage at the terminal 39 allows for the state of the second sensor 40 to be determined. It is to be understood that the examples in FIGS. 2 and 3 are examples and are not meant to be limiting.

Figure 4:
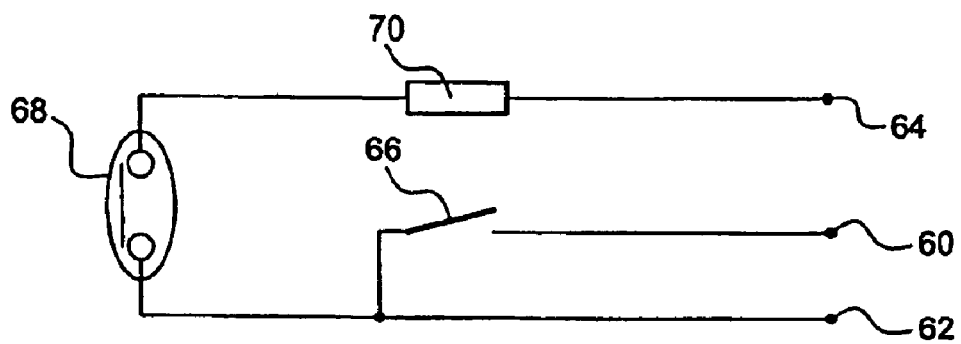
FIG. 4 illustrates an electrical schematic of the sensor module according to a second embodiment of the invention.
Figure 5:
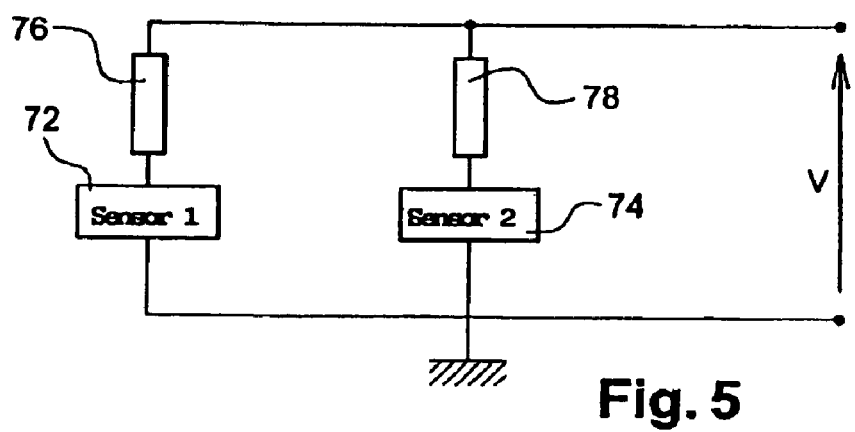
FIG. 5 illustrates an electrical schematic of the sensor module according to a third embodiment of the invention.

FIGS. 4 and 5 show embodiments of the present invention. In these embodiments, the sensor module includes two sensors that are both able to detect displacement, even when they are not supplied with power and that consume little or no power. Preferably, sensors with different detection technologies are used to reduce the risk of a common failure mode. Because the two sensors consume little or no power when they are not actuated, it is not necessary for one of the two sensors to electrically isolate the other sensor when idle. Preferably, one of the two sensors is used to power the vehicle openable member electronics, reducing the number of electronics starting terminals and simplifying its structure.

FIG. 4 shows a diagram of the reading circuit. The first sensor 66 is a changeover switch, and the second sensor 68 is a reed switch, in this example. The circuit includes three terminals 60, 62 and 64. The first sensor 66 is mounted between the terminals 60 and 62, and the second sensor 68 is mounted in series with a protective resistor 70 between the terminals 64 and 62. The terminal 62 is connected to ground, and the signals at the terminals 60 and 64 reflect the state of the sensors 66 and 68.

FIG. 5 shows another reading circuit. As in the example in FIG. 4, the two sensors 72 and 74 are displacement sensors that consume little or no power. FIG. 5 shows a possible mounting of the sensors 72 and 74 for analog detection. Each sensor 72 and 74 is mounted in series with a resistor 76 and 78. The resistors 76 and 78 preferably have different values. A voltage V is applied in parallel to the terminals of the two series mountings. It will be understood that the voltage depends on the state of the two sensors 72 and 74 and has a different value depending on whether none, one, or both of the sensors 72 and 74 are conducting. The circuit in FIG. 5 is a simple analog circuit for displacement detection, with redundant detection.

Like the sensor module 2 in FIGS. 1 to 3, the sensor module in FIGS. 4 and 5 is preferably used for a motor vehicle openable member release control. Preferably, two sensors are used to detect the movement of the same part, such as the handle or a plunger. The sensor module 2 then provides redundant detection. In the examples in FIGS. 6 to 9, the movement of the moving part may act directly on the two sensors. Of course, intermediate parts may also be provided so that the movement of the handle or plunger directly or indirectly acts on the two sensors.

Figure 6:
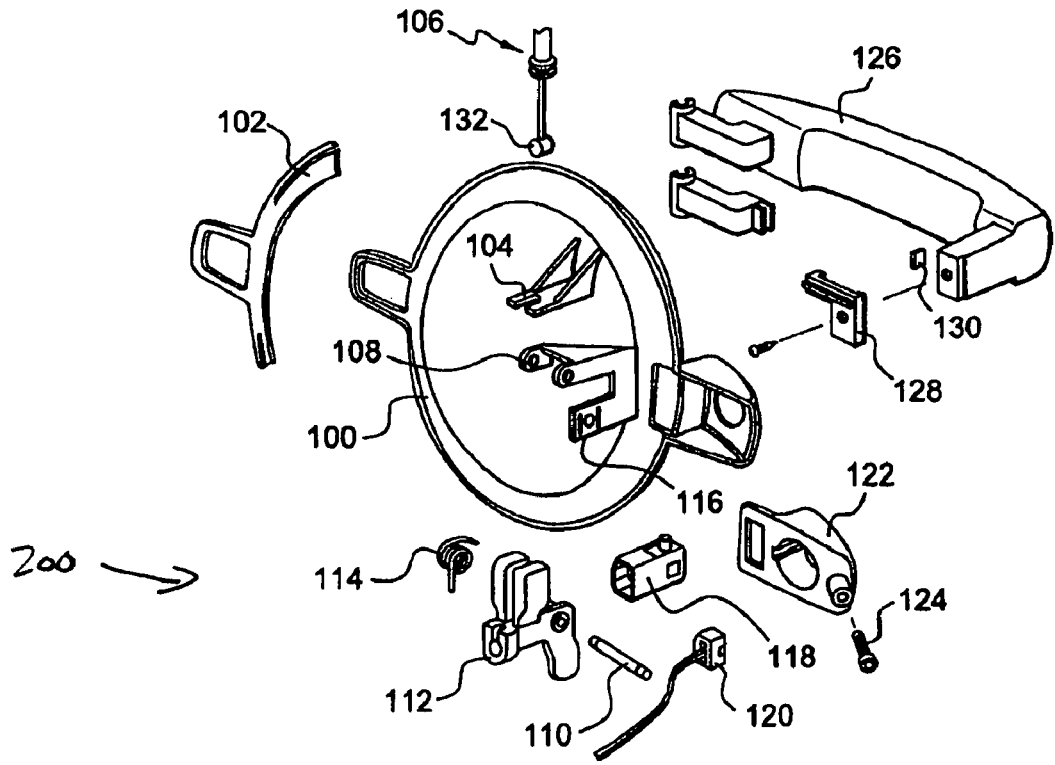
FIG. 6 illustrates an exploded perspective view of a release control in which the sensor module according to the present invention may be used.
Figure 7:
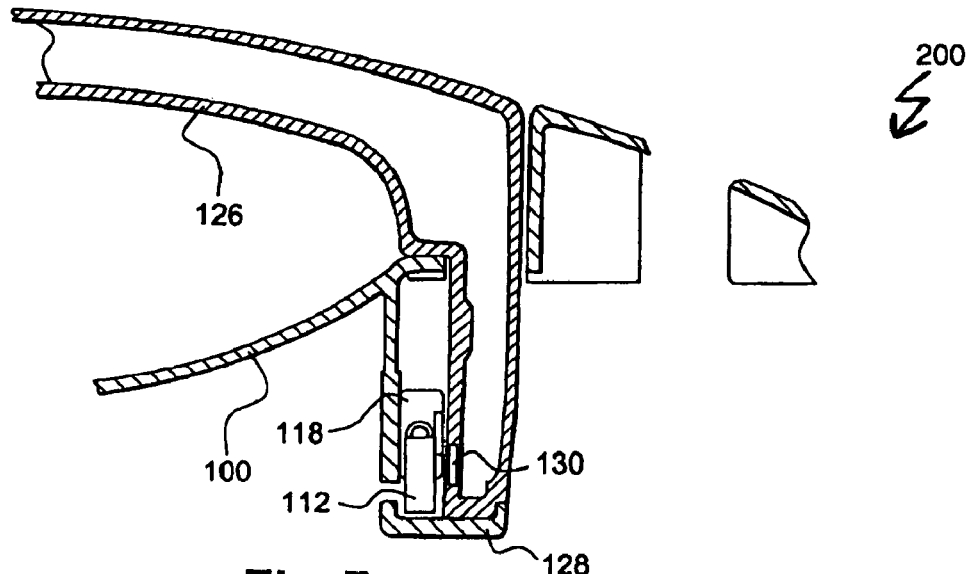
FIG. 7 illustrates a partial cross-section of the control in FIG. 6.

FIGS. 6 to 9 show examples of a sensor module used in motor vehicle openable member release controls. In these examples, the sensor modules detect the movement of the same moving part, which is the moving handle of the control. The control in FIGS. 6 and 7 is an external pull handle opening control 200 with a moving pull handle 126. The sensor module 118 detects the movement of the pull handle 126. The movement of the pull handle 126 is detected directly by the second sensor and indirectly by the first sensor, which is acted upon through the opening lever. Whether detection is direct or indirect, the sensor module 118 redundantly detects the movement of a single part. The external opening control 202 in FIGS. 8 and 9 includes an opening paddle handle 152, and the sensor module 158 detects the movement of the opening paddle handle 152.

FIG. 6 shows an exploded perspective view of the external pull handle opening control 200 including an external opening control housing 100 and a seal 102 inserted between the openable member and the housing 100. The housing 100 includes a stop 104 for the sheath 106 of a cable. Openings 108 in the housing 100 hold a shaft 110 that rotates an opening lever 112. A return spring 114 fitted between the opening lever 112 and the housing 100 returns the opening lever 112 to an idle position. The housing 100 also includes an attachment feature 116 for attaching a sensor module 118, such as the sensor module 2 shown in FIG. 1. In the example, the attachment feature 116 includes two slots and a hole for the stud 10. FIG. 6 shows the sensor module 118 and the cable harness 120. A catch bolt seat 122 is fixed in the housing 100 by a screw 124. Finally, FIG. 6 shows the pull handle 126 and an opening cam 128 fixed to the pull handle 126 by a screw (not numbered). The pull handle 126 may be fitted with a magnet 130. The end 132 of the cable can be driven by the opening lever 112. The sensor module 118 is similar to the sensor module 2 in FIGS. 1 to 3, except that the Hall effect sensor is not arranged on the same side of the sensor module 118.

The components in FIG. 6 may be used in a mechanical release configuration. In this case, the pull handle 126 is mounted on the housing 100, the opening lever 112 is mounted with the return spring 114, the opening cam 128 is mounted on the pull handle 126, the catch bolt seat 122 is mounted in the housing 100, the sheath 106 is arranged in the housing 100, and the end of the cable is arranged in the opening lever 112. Neither the sensor module 118 nor the magnet 130 is employed. The lock is then purely mechanical. When the pull handle 126 is pulled, it acts rotatably against the force of the return spring 114 on the opening lever 112 via the opening cam 128. The opening lever 112 pulls on the end of the cable and releases the lock, assuming prior security unlocking has been performed by means not described here.

When the user lets go of the pull handle 126, the return spring 114 returns the opening lever 112 and then the pull handle 126 to the idle position.

The components in FIG. 6 can be used for an electric release configuration. The release is electrically controlled by a changeover switch that is, for example, installed at the lock end of the cable. The movement of the cable can then control the activation of electric opening. In this case, the sensor module is not necessary. Again, the components in FIG. 6 can be used for an electric release configuration with electrically controlled release. The sensor module 118 is then mounted on the housing 100 and connected to the cable harness 120. The magnet 130 is mounted on the pull handle 126 if redundancy is required. The electric opening motor can then be started and controlled by the sensors in the sensor module 118. The cable can be used to activate the electric opening, as disclosed in French Patent Application serial Nos. FR 02-01698 and FR 02-01699. In this case, the sensor module 118 controls the electric opening.

Finally, the components in FIG. 6 can be used in a purely electric release configuration. In this case, the assembly is the same, except that the cable is not used. FIG. 7 shows a partial cross-section of the external pull handle opening control 200 in an idle position. The housing 100, the pull handle 126 with the magnet 130, the opening cam 128, the opening lever 112, and the sensor module 118 are shown in FIG. 7. When the pull handle 126 is pulled, the opening lever 112 rotates around the shaft 110 against the action of the return spring 114 via the opening cam 128. The lower part of the opening lever 112 acts on the first sensor in the sensor module 118, which is arranged on the top. This closes the electric circuit of the sensor module 118 and supplies power to the second sensor. At the same time, the magnet 130 moves in front of the second sensor in the sensor module 118 and provides redundant information about the actuation of the pull handle 126.

When the user releases the pull handle 126, the return spring 114 returns the opening lever 112, and therefore the pull handle 126, to the idle position. The opening lever 112 does not act on the first sensor, the sensor module 118 returns to the idle position, and the Hall effect sensor power supply circuit is broken. In other embodiments, the counter gear formed by the opening lever 112 and the opening cam 128 can be eliminated.

Thus, the sensor module 118 and the corresponding magnet 130 can be retrofitted to the external pull handle opening control 200, depending on the type of opening control.

Figure 8:
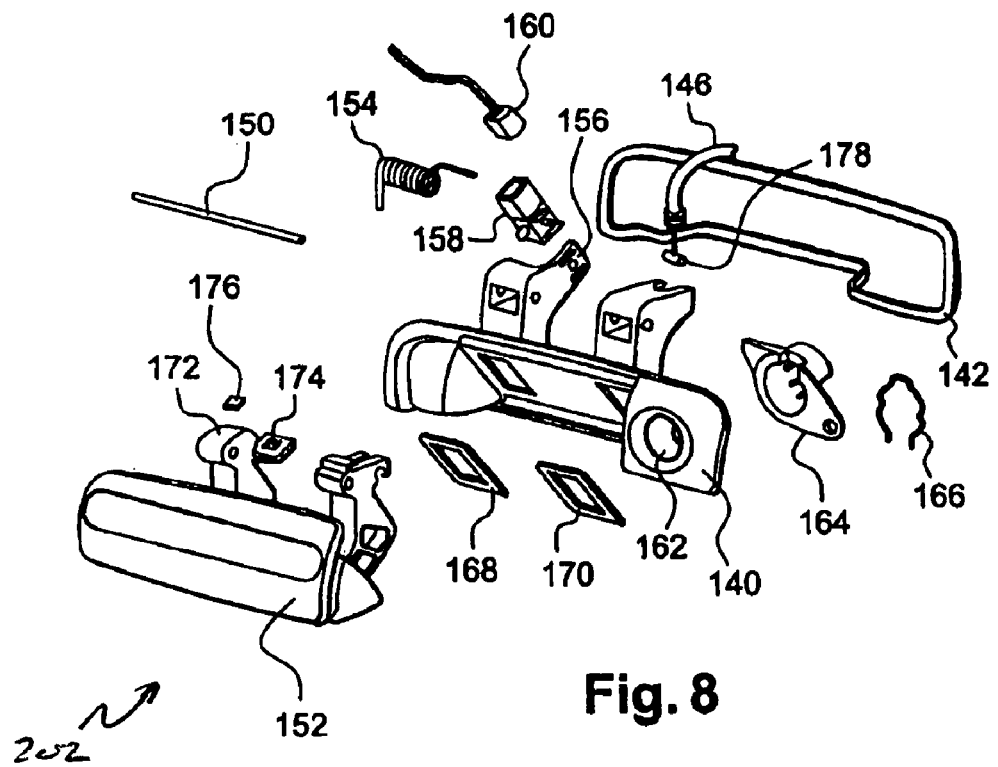
FIG. 8 illustrates an exploded perspective view of another release control in which the sensor module according to the present invention may be used.
Figure 9:
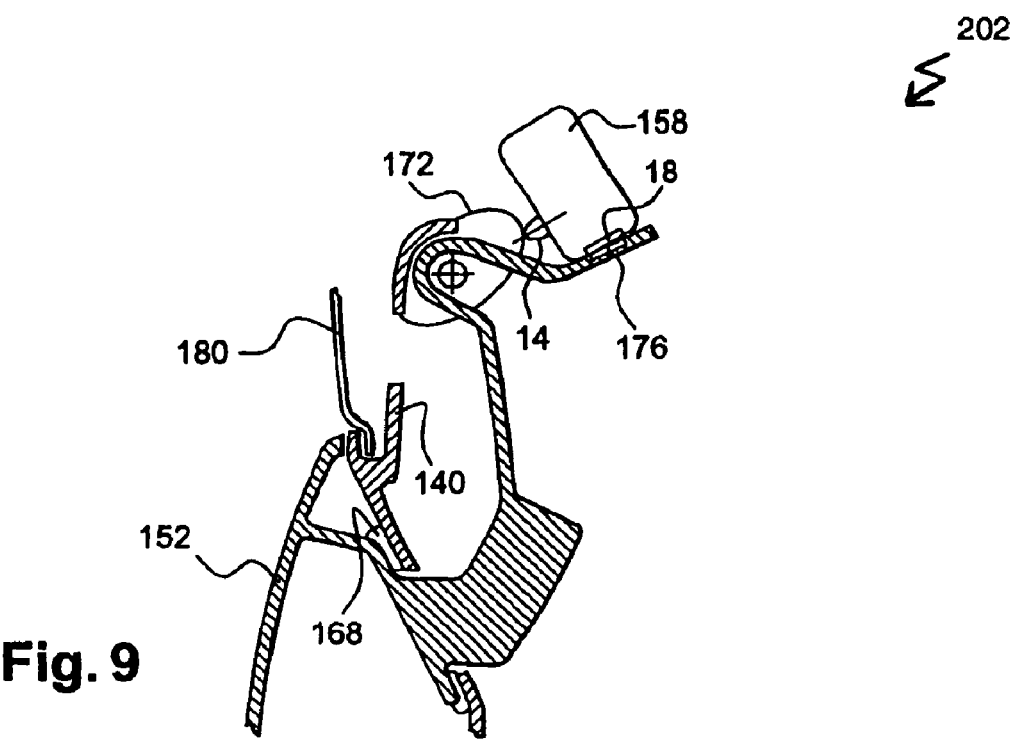
FIG. 9 illustrates a partial cross-section of the control in FIG. 8.

FIGS. 8 and 9 are analogous to the views in FIGS. 6 and 7 for a moving opening paddle handle 152. FIG. 8 shows an exploded perspective view of the external opening control 202 including an external opening control housing 140 and a seal 142 assembled on the side of the openable member. The housing 140 includes a stop 144 for the sheath 146 of a cable, and the housing 140 includes openings 148 to hold a shaft 150 to rotate the opening paddle handle 152. A return spring 154 is mounted between the opening paddle handle 152 and the housing 140 to return the opening paddle handle 152 to an idle position. The housing 140 also has an attachment feature 156 for fitting a sensor module 158, similar to the sensor module 2 illustrated in FIG. 1. In the example, the attachment feature 156 includes two slots and a hole for the stud 10. FIG. 8 shows the sensor module 158 and a cable harness 160. A catch bolt seat 162 is provided in the housing 140, and a bolt cam 164 is fixed onto the housing 140. A circlip 166 fixes a catch bolt in position, and seals 168 and 170 are illustrated for the opening paddle handle 152. Part of the opening paddle handle 152 forms an opening cam 172 and a seat 174 for a magnet 176. The end 178 of the cable can be driven by the opening paddle handle 152. The sensor module 158 is similar to the sensor module 2 illustrated in FIGS. 1 to 3.

As explained with reference to FIGS. 6 and 7, the various components in FIG. 8 can be used in different configurations, including a mechanical release configuration, an electric release configuration with the release controlled electrically by a changeover switch, an electric release configuration with release controlled electrically, or a purely electric release configuration.

FIG. 9 shows a vertical cross-section of the external opening control 202 of FIG. 8 utilizing the sensor module 158. The external opening control 202 is in an idle position. The sensor module 158, the sensing part 18 of the Hall effect sensor, the external opening control housing 140, the opening paddle handle 152, the seal 168, and an external side 180 of the openable member are shown. In the idle position shown in FIG. 9, the opening paddle handle 152 is against the housing 140. The opening cam 172 does not act upon the flexible bellows 14 of the sensor module 158, and the second Hall effect sensor is not powered. When the opening paddle handle 152 is pulled, the opening cam 172 rotates clockwise in FIG. 9.

The opening cam 172 of the opening paddle handle 152 acts on the first sensor, starting the openable member electronics and supplying power to the second Hall effect sensor. At the same time, the magnet 176 detaches from the sensing part 18 and confirms the opening. For purely electric release, the release motor is started and triggered. In the example in FIG. 9, the opening cam 172 continues to move, and the housing 140 of the sensor module 158 does not act as a stop, reducing the stress on the sensor module 158. The sensor module 158 can also act as a limit stop for the opening paddle handle 152.

It will be understood from FIGS. 6 to 9 that the order of switching of the two sensors may vary. Thus, the second sensor may switch from a first state to a second state before the first sensor closes the electric circuit. After the closure of the electric circuit, it is detected whether the second sensor is in the second state. Alternatively, if detection of the switching of the second sensor is required, the sensor module is implanted such that the first sensor is acted on before the second sensor switches. This last solution is particularly advantageous for approach detection sensors (optical, capacitive or ultrasonic) for which the change of state is detected.

Of course, the invention is not limited to the embodiments described above. Thus, in the examples, the invention is described as applied to the release of a door. The invention applies more generally to any openable member on the vehicle, and particularly to a trunk lid or door. The sensor module of the invention can be used in controls having a different structure than the ones shown in FIGS. 6 to 9. The sensor module could also be used in a control with a handle having a central idle position that is moveable in two opposite directions, such as the handle on the rear doors of vehicles produced by Peugeot under the 806 model. In this case, the first sensor could be actuated as soon as the handle leaves the central idle position. The second sensor could detect the movement of the handle in a single direction. This allows for a purely electric release control in one direction of movement and a purely mechanical control in the other direction of movement to hold the openable member of a moving hook type in a fully open position.

The examples in FIGS. 6 to 9 utilize the sensor modules of FIGS. 1 to 3 to redundantly detect the movement of a part, such as a pull handle 126 or an opening paddle handle 152. The sensor module 118 in FIGS. 4 and 5 could be used in the same way in the external opening controls in FIGS. 6 to 9.

Moreover, the sensor module 2 in FIGS. 1 to 3 first detects the displacement of a moving part and then detects a different actuation. For example, the sensor module could equally be used in a control having a fixed handle and a plunger, like the control used on the vehicles produced by BMW under the Mini model. In this case, the first sensor and the second sensor can detect the movement of the plunger, as explained with reference to FIGS. 6 to 9. The second sensor could alternatively detect the presence of the user's hand on the fixed handle. In this case, the second sensor could be a capacitive sensor powered only when the first sensor is actuated by the plunger.

In the examples proposed above, the invention is applied to an external opening control. However, it can also be used in an internal opening control.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A sensor module comprising:
   a first sensor to detect displacement of a moving part;
   an electric circuit, wherein the first sensor closes the electric circuit when the first sensor detects displacement of the moving part; and
   a second sensor to confirm displacement of the moving part detected by the first sensor.

2. The sensor module according to claim 1, wherein the second sensor is powered through the electric circuit.

3. The sensor module according to claim 1, wherein a state of the second sensor is read by the electric circuit.

4. The sensor module according to claim 1, wherein the second sensor is selected from the group consisting of a deformation sensor, a displacement sensor, a force sensor and a proximity sensor.

5. The sensor module according to claim 1, wherein the first sensor is selected from the group consisting of a changeover switch and a reed switch.

6. The sensor module according to claim 1, wherein the second sensor is selected from the group consisting of a changeover switch and a reed switch.

7. The sensor module according to claim 1, wherein the first sensor and the second sensor are different sensor types.

8. The sensor module according to claim 1, wherein the first sensor electrically isolates the second sensor when the first sensor is not actuated.

9. The sensor module according to claim 1, wherein movement of the moving part is detected by the first sensor and the second sensor.

10. A motor vehicle openable member release control comprising:
    a moving part; and
    a sensor module including:
      a first sensor to detect displacement of the moving part,
      an electric circuit, wherein the first sensor closes the electric circuit when the first sensor detects displacement of the moving part, and
      a second sensor to confirm detection by the first sensor of displacement of the moving part, wherein movement of the moving part is detected by the first sensor and the second sensor.

11. The motor vehicle openable member release control according to claim 10, wherein the second sensor is powered through the electric circuit.

12. The motor vehicle openable member release control according to claim 10, wherein a state of the second sensor is read by the electric circuit.

13. The motor vehicle openable member release control according to claim 10, wherein the second sensor is selected from the group consisting of a deformation sensor, a displacement sensor, a force sensor and a proximity sensor.

14. The motor vehicle openable member release control according to claim 10, wherein the first sensor is selected from the group consisting of a changeover switch and a reed switch.

15. The motor vehicle openable member release control according to claim 10, wherein the second sensor is selected from the group consisting of a changeover switch and a reed switch.

16. The motor vehicle openable member release control according to claim 10, wherein the first sensor and the second sensor are different sensor types.

17. The motor vehicle openable member release control according to claim 10, wherein displacement of the moving part is detected indirectly by the first sensor and directly by the second sensor.

18. The motor vehicle openable member release control according to claim 10, wherein the moving part is a handle.

19. The motor vehicle openable member release control according to claim 10, wherein the sensor module further includes a housing having assembly features that attach the sensor module to the motor vehicle openable member release control, wherein the assembly features are a first tab, a second tab, and a locating feature located between the first tab and the second tab, and the locating feature is closer to one of the first tab and the second tab than the other of the first tab and the second tab.

20. The motor vehicle openable member release control according to claim 10, wherein the moving part acts directly on one of the first sensor and the second sensor.

21. The motor vehicle openable member release control according to claim 10, wherein the first sensor electrically isolates the second sensor when the first sensor is not actuated.

* * * * *